United States Patent
Taylor et al.

(10) Patent No.: US 12,361,361 B2
(45) Date of Patent: Jul. 15, 2025

(54) COUNTERFACTUAL EVALUATION OF POLICIES FOR CATEGORIES OF ITEMS USING MACHINE LEARNING PREDICTION OF OUTCOMES

(71) Applicant: Maplebear Inc., San Francisco, CA (US)

(72) Inventors: Cameron Nicholas Taylor, Walnut Creek, CA (US); Robert Fletcher, Los Angeles, CA (US); Pedro Tanure Veloso, San Francisco, CA (US); Tilman Drerup, Palo Alto, CA (US); Rob Donnelly, San Francisco, CA (US); Ben Lowenstein, San Francisco, CA (US); Matthew Wean, San Francisco, CA (US)

(73) Assignee: Maplebear Inc., San Francisco, CA (US)

( * ) Notice: Subject to any disclaimer, the term of this patent is extended or adjusted under 35 U.S.C. 154(b) by 273 days.

(21) Appl. No.: 18/087,547

(22) Filed: Dec. 22, 2022

(65) Prior Publication Data

US 2024/0211842 A1    Jun. 27, 2024

(51) Int. Cl.
*G06Q 10/0637*    (2023.01)
*G06Q 10/087*    (2023.01)

(52) U.S. Cl.
CPC ..... *G06Q 10/06375* (2013.01); *G06Q 10/087* (2013.01)

(58) Field of Classification Search
None
See application file for complete search history.

(56) References Cited

U.S. PATENT DOCUMENTS

| 7,346,520 B2 * | 3/2008 | Etzioni | G06Q 10/06 |
| | | | 705/400 |
| 8,051,015 B2 * | 11/2011 | Veit | G06Q 30/0283 |
| | | | 705/14.35 |

(Continued)

FOREIGN PATENT DOCUMENTS

| WO | WO-0116685 A1 * | 3/2001 | .......... G06Q 10/08 |
| WO | WO-2006047582 A2 * | 5/2006 | .......... G06F 21/88 |

OTHER PUBLICATIONS

Dialog "Maplebear Inc Granted Patent for Optimizing Task Assignments in a Delivery System", Oct. 2020, Global IP News. Software Patent News, p. 1 (Year: 2020).*

*Primary Examiner* — Romain Jeanty
(74) *Attorney, Agent, or Firm* — Fenwick & West LLP

(57) ABSTRACT

An online concierge system fulfills orders for items offered by retailers and may increase the price of an item offered by a retailer in some instances. The online concierge system applies a markup to an item by applying a pricing policy to a category including the item. To optimize application of pricing policies to categories, the online concierge system categorizes items offered by the retailer and applies an outcome model to combinations of categories and pricing policies. From the output of the outcome model, the online concierge system selects a set of categories and corresponding pricing policies. Using a price adjustment model, the online concierge system determines modifications to one or more of the pricing policies of the set to enforce one or more constraints across multiple pricing policies.

20 Claims, 6 Drawing Sheets

(56) References Cited

U.S. PATENT DOCUMENTS

| | | | |
|---|---|---|---|
| 8,374,906 B1* | 2/2013 | Williams | G06Q 30/02 |
| | | | 705/400 |
| 2002/0178077 A1* | 11/2002 | Katz | G06Q 10/10 |
| | | | 705/7.36 |
| 2003/0023567 A1* | 1/2003 | Berkovitz | G06Q 30/0283 |
| | | | 705/400 |
| 2003/0033179 A1* | 2/2003 | Katz | G06Q 10/0631 |
| | | | 705/7.41 |
| 2003/0093313 A1* | 5/2003 | Kiefer | G06Q 10/06375 |
| | | | 705/7.34 |
| 2012/0303410 A1* | 11/2012 | Connors | G06Q 10/087 |
| | | | 705/7.31 |
| 2013/0024525 A1* | 1/2013 | Brady | G06Q 10/107 |
| | | | 709/206 |
| 2014/0164126 A1* | 6/2014 | Nicholas | A63F 9/24 |
| | | | 705/14.58 |
| 2018/0089707 A1* | 3/2018 | Sills | G06Q 10/067 |
| 2020/0074480 A1* | 3/2020 | Pekelis | G06F 7/588 |

* cited by examiner

COUNTERFACTUAL EVALUATION OF POLICIES FOR CATEGORIES OF ITEMS USING MACHINE LEARNING PREDICTION OF OUTCOMES

BACKGROUND

An online concierge shopping system may receive, from users, orders including items offered by one or more retailers. The online concierge system fulfills orders from a user by instructing a picker (or a shopper) to obtain items included in an order and deliver the items in the order to the user. In some instances, the online concierge system may sell an item from a retailer at an increased, or marked-up, price (e.g., relative to the price at which the retailer sells the item).

In many configurations, an online concierge system may apply a specific markup to items offered by a retailer, with the specific markup applied to each item offered by the retailer. While this allows an online concierge system to apply different markups to different retailers, such a retailer-specific markup does not account for differing amounts of revenue generated by different items, which may decrease revenue received by the online concierge system or by the retailer from different items. To attempt a different or more customized scheme, however, may be computationally intensive as the online concierge systems typically offer a large number of items to users. Additionally, —changing a price of an item may affect prices of other items or sales of other items and increase the complexity of determining how prices of different items should be set. Because of the large number of items offered by an online concierge system and the interrelationships between prices and revenues of items, it is impractical—if not impossible—for an online concierge system to evaluate different combinations of prices for different items in a useful way, given the amount of time and computational resources needed for such evaluation.

SUMMARY

In accordance with one or more aspects of the disclosure, an online concierge system determines a category for various items offered by a retailer through the online concierge system. In various embodiments, the online concierge system trains a classification model based on items included in prior orders from the retailer, an objective specifying a common attribute for each category, and a taxonomy maintained by the online concierge system describing a hierarchy of items. In the taxonomy, higher levels include more generalized attributes of an item, while lower levels include more specific attributes of items. The retailer specifies the objective for the categories in some embodiments. For example, an objective specifies a percentage of revenue (or a percentage of gross merchandise value) for each category, which causes the classification model to determine categories for items so a portion of revenue to the retailer from items in the category equals, or is within a threshold amount, of the percentage specified by the objective. Such an embodiment allows the online concierge system to determine categories for items so each category has an equal, or an approximately equal, percentage of revenue obtained by the retailer. In other embodiments, the online concierge system trains the classification model using other data or the classification model receives different or additional input for determining categories for items.

With categories determined for items offered by the retailer, the online concierge system applies pricing policies to different categories. In some embodiments, the online concierge system maintains a set of pricing policies, with a pricing policy specifying an amount, or a markup, by which the online concierge system increases a price of an item offered by the retailer. The online concierge system applies different pricing policies to different categories, rather than applying a common pricing policy to each category. In various embodiments, the pricing policies of the set are alternatives to a pricing policy that the online concierge system applies across multiple categories of the retailer.

During a time interval, the online concierge system receives orders from users and fulfills the orders from the retailer. An item included in an order received during the time interval has a price specified by a pricing policy applied to the category. This allows the online concierge system to collect data describing user orders when different pricing policies are applied to categories. In various embodiments, different pricing policies are applied to categories for different users accessing the retailer, allowing the online concierge system to obtain data describing ordering by users when different pricing policies are applied to categories of items.

From the orders received from users while pricing policies were applied to categories, the online concierge system trains one or more outcome models. An outcome model receives one or more categories and corresponding pricing policies applied to the categories as input and outputs a predicted outcome for categories with the corresponding pricing policies applied. In some embodiments, the predicted outcome is a predicted revenue (or a predicted gross merchandise value) from a category when the corresponding pricing policy is applied to the category. In various embodiments, the outcome model outputs a set of combinations that each include a category and a corresponding pricing policy with a predicted outcome (e.g., a predicted amount of revenue) when the pricing policy is applied to a corresponding category. In various embodiments, the outcome model is trained from orders received and fulfilled while various pricing policies were applied to different categories, allowing the online concierge system to train the outcome model based on previously received orders, so the outcome model accounts for user reactions and orders to pricing policies applied to categories.

With the one or more outcome models trained, the online concierge system applies a trained outcome model to different combinations of categories and corresponding pricing policies. From the predicted outcomes output by the outcome model, the online concierge system selects a set of combinations of the categories and pricing policies. Each selected combination includes a category and a corresponding pricing policy applied to the category. For example, the set of combinations of categories and pricing policies includes a pricing policy for each of a set of categories that results in a maximum predicted outcome (e.g., a maximum revenue) for a corresponding category. In other embodiments, the set of combinations of categories and pricing policies includes pricing policies resulting in a maximum combination of predicted outcomes across multiple categories. For example, the set of combinations of categories and pricing policies includes a pricing policy for each category of a set where a sum of predicted outcomes across the categories is maximized. Selecting the combinations of categories and corresponding pricing policies using the outcome model reduces the required computational resources needed to select one or more combinations of categories and corresponding pricing policies applied to the categories.

While the set of combinations of categories and pricing policies selected by the online concierge system identifies pricing policies optimizing an objective, such as a gross merchandise value or an amount of revenue, for different categories, the online concierge system also enforces one or more constraints to application of pricing policies across categories. Accordingly, the one or more constraints may prevent a retailer from losing revenue across multiple categories because of pricing policies applied to different categories. For example, a constraint enforced by the online concierge system may specify an average markup to be maintained across all of the categories. In some embodiments, the average markup constraint is weighted by a revenue obtained from items in a category, so a markup applied to a category by a pricing policy is weighted based on an amount of revenue the retailer receives from items of the category.

To enforce the one or more constraints, the online concierge system applies a price adjustment model including the one or more constraints to outcomes predicted by the outcome model for each category based on a pricing policy corresponding to a category and revenue to the retailer from each category based on its corresponding pricing policy. The price adjustment model outputs modifications to pricing policies to one or more categories so the modified pricing policies result in pricing policies applied to multiple categories that satisfy the one or more constraints. In some embodiments, the price adjustment model also receives as input a number of categories for which the markup is capable of being changed. As the price adjustment model outputs changes to pricing policies applied to one or more categories, specifying the number of categories for which a corresponding policy is capable of being modified allows the retailer to regulate a number of pricing policies that are modified. The trained price adjustment model outputs one or more categories with corresponding modifications to a pricing policy applied to a category. For example, a price adjustment model outputs a category and an amount by which a markup specified by the pricing policy applied to the category is to be increased or is to be decreased. The online concierge system stores the modified pricing policies and corresponding categories in association with the retailer for subsequent application to orders specifying the retailer.

DETAILED DESCRIPTION

Figure 1:
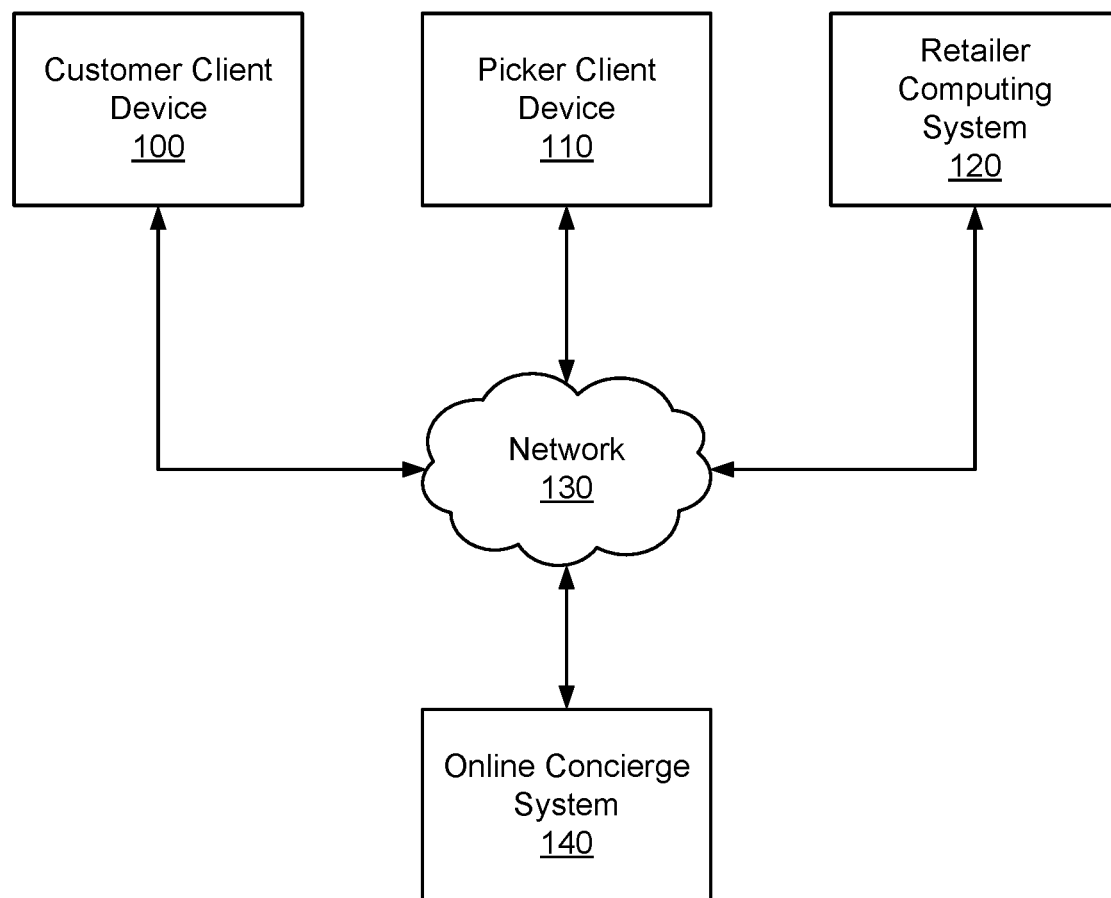
FIG. 1 illustrates an example system environment for an online concierge system, in accordance with one or more embodiments.

FIG. 1 illustrates an example system environment for an online concierge system 140, in accordance with one or more embodiments. The system environment illustrated in FIG. 1 includes a customer client device 100, a picker client device 110, a retailer computing system 120, a network 130, and an online concierge system 140. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

As used herein, customers, pickers, and retailers may be generically referred to as "users" of the online concierge system 140. Additionally, while one customer client device 100, picker client device 110, and retailer computing system 120 are illustrated in FIG. 1, any number of customers, pickers, and retailers may interact with the online concierge system 140. As such, there may be more than one customer client device 100, picker client device 110, or retailer computing system 120.

The customer client device 100 is a client device through which a customer may interact with the picker client device 110, the retailer computing system 120, or the online concierge system 140. The customer client device 100 can be a personal or mobile computing device, such as a smartphone, a tablet, a laptop computer, or desktop computer. In some embodiments, the customer client device 100 executes a client application that uses an application programming interface (API) to communicate with the online concierge system 140.

A customer uses the customer client device 100 to place an order with the online concierge system 140. An order specifies a set of items to be delivered to the customer. An "item," as used herein, means a good or product that can be provided to the customer through the online concierge system 140. The order may include item identifiers (e.g., a stock keeping unit or a price look-up code) for items to be delivered to the user and may include quantities of the items to be delivered. Additionally, an order may further include a delivery location to which the ordered items are to be delivered and a timeframe during which the items should be delivered. In some embodiments, the order also specifies one or more retailers from which the ordered items should be collected.

The customer client device 100 presents an ordering interface to the customer. The ordering interface is a user interface that the customer can use to place an order with the online concierge system 140. The ordering interface may be part of a client application operating on the customer client device 100. The ordering interface allows the customer to search for items that are available through the online concierge system 140 and the customer can select which items to add to a "shopping list." A "shopping list," as used herein, is a tentative set of items that the user has selected for an order but that has not yet been finalized for an order. The ordering interface allows a customer to update the shopping list, e.g., by changing the quantity of items, adding or removing items, or adding instructions for items that specify how the item should be collected.

The customer client device 100 may receive additional content from the online concierge system 140 to present to a customer. For example, the customer client device 100 may receive coupons, recipes, or item suggestions. The customer client device 100 may present the received additional content to the customer as the customer uses the customer client device 100 to place an order (e.g., as part of the ordering interface).

Additionally, the customer client device 100 includes a communication interface that allows the customer to communicate with a picker that is servicing the customer's order. This communication interface allows the user to input a text-based message to transmit to the picker client device 110 via the network 130. The picker client device 110 receives the message from the customer client device 100 and presents the message to the picker. The picker client device 110 also includes a communication interface that allows the picker to communicate with the customer. The picker client device 110 transmits a message provided by the picker to the customer client device 100 via the network 130. In some embodiments, messages sent between the customer client device 100 and the picker client device 110 are transmitted through the online concierge system 140. In addition to text messages, the communication interfaces of the customer client device 100 and the picker client device 110 may allow the customer and the picker to communicate through audio or video communications, such as a phone call, a voice-over-IP call, or a video call.

The picker client device 110 is a client device through which a picker may interact with the customer client device 100, the retailer computing system 120, or the online concierge system 140. The picker client device 110 can be a personal or mobile computing device, such as a smartphone, a tablet, a laptop computer, or desktop computer. In some embodiments, the picker client device 110 executes a client application that uses an application programming interface (API) to communicate with the online concierge system 140.

The picker client device 110 receives orders from the online concierge system 140 for the picker to service. A picker services an order by collecting the items listed in the order from a retailer. The picker client device 110 presents the items that are included in the customer's order to the picker in a collection interface. The collection interface is a user interface that provides information to the picker on which items to collect for a customer's order and the quantities of the items. In some embodiments, the collection interface provides multiple orders from multiple customers for the picker to service at the same time from the same retailer location. The collection interface further presents instructions that the customer may have included related to the collection of items in the order. Additionally, the collection interface may present a location of each item in the retailer location, and may even specify a sequence in which the picker should collect the items for improved efficiency in collecting items. In some embodiments, the picker client device 110 transmits to the online concierge system 140 or the customer client device 100 which items the picker has collected in real time as the picker collects the items.

The picker can use the picker client device 110 to keep track of the items that the picker has collected to ensure that the picker collects all of the items for an order. The picker client device 110 may include a barcode scanner that can determine an item identifier encoded in a barcode coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and determines the item identifier for the item based on the images. The picker client device 110 may determine the item identifier directly or by transmitting the images to the online concierge system 140. Furthermore, the picker client device 110 determines a weight for items that are priced by weight. The picker client device 110 may prompt the picker to manually input the weight of an item or may communicate with a weighing system in the retailer location to receive the weight of an item.

When the picker has collected all of the items for an order, the picker client device 110 instructs a picker on where to deliver the items for a customer's order. For example, the picker client device 110 displays a delivery location from the order to the picker. The picker client device 110 also provides navigation instructions for the picker to travel from the retailer location to the delivery location. Where a picker is servicing more than one order, the picker client device 110 identifies which items should be delivered to which delivery location. The picker client device 110 may provide navigation instructions from the retailer location to each of the delivery locations. The picker client device 110 may receive one or more delivery locations from the online concierge system 140 and may provide the delivery locations to the picker so that the picker can deliver the corresponding one or more orders to those locations. The picker client device 110 may also provide navigation instructions for the picker from the retailer location from which the picker collected the items to the one or more delivery locations.

In some embodiments, the picker client device 110 tracks the location of the picker as the picker delivers orders to delivery locations. The picker client device 110 collects location data and transmits the location data to the online concierge system 140. The online concierge system 140 may transmit the location data to the customer client device 100 for display to the customer such that the customer can keep track of when their order will be delivered. Additionally, the online concierge system 140 may generate updated navigation instructions for the picker based on the picker's location. For example, if the picker takes a wrong turn while traveling to a delivery location, the online concierge system 140 determines the picker's updated location based on location data from the picker client device 110 and generates updated navigation instructions for the picker based on the updated location.

In one or more embodiments, the picker is a single person who collects items for an order from a retailer location and delivers the order to the delivery location for the order. Alternatively, more than one person may serve the role as a picker for an order. For example, multiple people may collect the items at the retailer location for a single order. Similarly, the person who delivers an order to its delivery location may be different from the person or people who collected the items from the retailer location. In these embodiments, each person may have a picker client device 110 that they can use to interact with the online concierge system 140.

Additionally, while the description herein may primarily refer to pickers as humans, in some embodiments, some or all of the steps taken by the picker may be automated. For example, a semi- or fully-autonomous robot may collect items in a retailer location for an order and an autonomous vehicle may deliver an order to a customer from a retailer location.

The retailer computing system 120 is a computing system operated by a retailer that interacts with the online concierge system 140. As used herein, a "retailer" is an entity that operates a "retailer location," which is a store, warehouse, or other building from which a picker can collect items. The retailer computing system 120 stores and provides item data to the online concierge system 140 and may regularly update the online concierge system 140 with updated item data. For example, the retailer computing system 120 provides item data indicating which items are available at a retailer location and the quantities of those items. Additionally, the retailer computing system 120 may transmit updated item data to the online concierge system 140 when an item is no longer available at the retailer location. Additionally, the retailer computing system 120 may provide the online concierge system 140 with updated item prices, sales, or availabilities. Additionally, the retailer computing system 120 may receive payment information from the online concierge system 140 for orders serviced by the online concierge system 140. Alternatively, the retailer computing system 120 may provide payment to the online concierge system 140 for some portion of the overall cost of a user's order (e.g., as a commission).

The customer client device 100, the picker client device 110, the retailer computing system 120, and the online concierge system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of standard layers used to describe a physical or virtual network, such as the physical layer, the data link layer, the network layer, the transport layer, the session layer, the presentation layer, and the application layer. The network 130 may include physical media for communicating data from one computing device to another computing device, such as MPLS lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online concierge system 140 is an online system by which customers can order items to be provided to them by a picker from a retailer. The online concierge system 140 receives orders from a customer client device 100 through the network 130. The online concierge system 140 selects a picker to service the customer's order and transmits the order to a picker client device 110 associated with the picker. The picker collects the ordered items from a retailer location and delivers the ordered items to the customer. The online concierge system 140 may charge a customer for the order and provides portions of the payment from the customer to the picker and the retailer.

As an example, the online concierge system 140 may allow a customer to order groceries from a grocery store retailer. The customer's order may specify which groceries they want delivered from the grocery store and the quantities of each of the groceries. The customer's client device 100 transmits the customer's order to the online concierge system 140 and the online concierge system 140 selects a picker to travel to the grocery store retailer location to collect the groceries ordered by the customer. Once the picker has collected the groceries ordered by the customer, the picker delivers the groceries to a location transmitted to the picker client device 110 by the online concierge system 140. The online concierge system 140 is described in further detail below with regards to FIG. 2.

Figure 2:
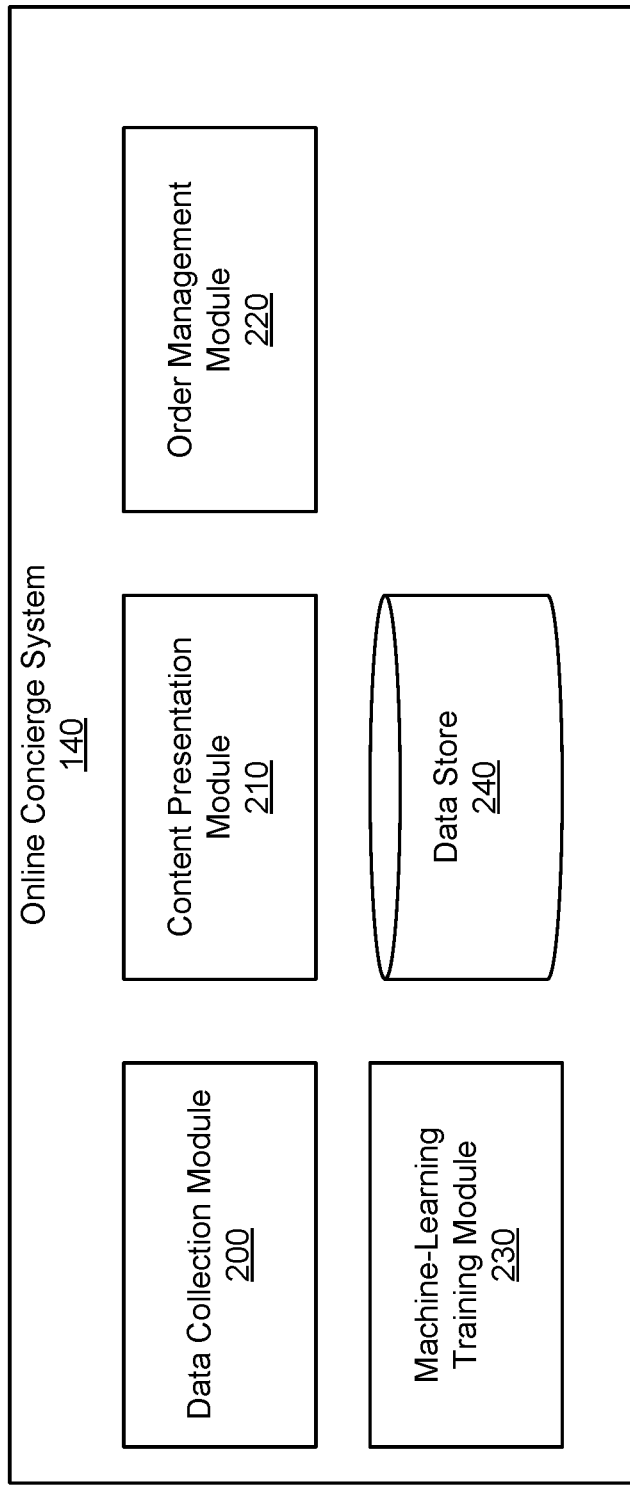
FIG. 2 illustrates an example system architecture for an online concierge system, in accordance with one or more embodiments.

FIG. 2 illustrates an example system architecture for an online concierge system 140, in accordance with some embodiments. The system architecture illustrated in FIG. 2 includes a data collection module 200, a content presentation module 210, an order management module 220, a machine learning training module 230, and a data store 240. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online concierge system 140 and stores the data in the data store 240. The data collection module 200 may only collect data describing a user if the user has previously explicitly consented to the online concierge system 140 collecting data describing the user. Additionally, the data collection module 200 may encrypt all data, including sensitive or personal data, describing users.

For example, the data collection module 200 collects customer data, which is information or data that describe characteristics of a customer. Customer data may include a customer's name, address, shopping preferences, favorite items, or stored payment instruments. The customer data also may include default settings established by the customer, such as a default retailer/retailer location, payment instrument, delivery location, or delivery timeframe. The data collection module 200 may collect the customer data from sensors on the customer client device 100 or based on the customer's interactions with the online concierge system 140.

The data collection module 200 also collects item data, which is information or data that identifies and describes items that are available at a retailer location. The item data may include item identifiers for items that are available and may include quantities of items associated with each item identifier. Additionally, item data may also include attributes of items such as the size, color, weight, stock keeping unit (SKU), or serial number for the item. The item data may further include purchasing rules associated with each item, if they exist. For example, age-restricted items such as alcohol and tobacco are flagged accordingly in the item data. Item data may also include information that is useful for predicting the availability of items in retailer locations. For example, for each item-retailer combination (a particular item at a particular warehouse), the item data may include a time that the item was last found, a time that the item was last not found (a picker looked for the item but could not find it), the rate at which the item is found, or the popularity of the item. The data collection module 200 may collect item data from a retailer computing system 120, a picker client device 110, or the customer client device 100.

An item category is a set of items that are a similar type of item. Items in an item category may be considered to be equivalent to each other or that may be replacements for each other in an order. For example, different brands of sourdough bread may be different items, but these items may be in a "sourdough bread" item category. The item categories may be human-generated and human-populated with items. The item categories also may be generated automatically by the online concierge system 140 (e.g., using a clustering algorithm).

The data collection module 200 also collects picker data, which is information or data that describes characteristics of pickers. For example, the picker data for a picker may include the picker's name, the picker's location, how often the picker has services orders for the online concierge system 140, a customer rating for the picker, which retailers the picker has collected items at, or the picker's previous shopping history. Additionally, the picker data may include preferences expressed by the picker, such as their preferred retailers to collect items at, how far they are willing to travel to deliver items to a customer, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online concierge system 140.

Additionally, the data collection module 200 collects order data, which is information or data that describes characteristics of an order. For example, order data may include item data for items that are included in the order, a delivery location for the order, a customer associated with the order, a retailer location from which the customer wants the ordered items collected, or a timeframe within which the customer wants the order delivered. Order data may further include information describing how the order was serviced, such as which picker serviced the order, when the order was delivered, or a rating that the customer gave the delivery of the order.

The content presentation module 210 selects content for presentation to a customer. For example, the content presentation module 210 selects which items to present to a customer while the customer is placing an order. The content presentation module 210 generates and transmits the ordering interface for the customer to order items. The content presentation module 210 populates the ordering interface with items that the customer may select for adding to their order. In some embodiments, the content presentation module 210 presents a catalog of all items that are available to the customer, which the customer can browse to select items to order. The content presentation module 210 also may identify items that the customer is most likely to order and present those items to the customer. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a customer. An item selection model is a machine learning model that is trained to score items for a customer based on item data for the items and customer data for the customer. For example, the item selection model may be trained to determine a likelihood that the customer will order the item. In some embodiments, the item selection model uses item embeddings describing items and customer embeddings describing customers to score items. These item embeddings and customer embeddings may be generated by separate machine learning models and may be stored in the data store 240.

In some embodiments, the content presentation module 210 scores items based on a search query received from the customer client device 100. A search query is text for a word or set of words that indicate items of interest to the customer. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a customer (e.g., by comparing a search query embedding to an item embedding).

In some embodiments, the content presentation module 210 scores items based on a predicted availability of an item. The content presentation module 210 may use an availability model to predict the availability of an item. An availability model is a machine learning model that is trained to predict the availability of an item at a retailer location. For example, the availability model may be trained to predict a likelihood that an item is available at a retailer location or may predict an estimated number of items that are available at a retailer location. The content presentation module 210 may weight the score for an item based on the predicted availability of the item. Alternatively, the content presentation module 210 may filter out items from presentation to a customer based on whether the predicted availability of the item exceeds a threshold.

The order management module 220 that manages orders for items from customers. The order management module 220 receives orders from a customer client device 100 and assigns the orders to pickers for service based on picker data. For example, the order management module 220 assigns an order to a picker based on the picker's location and the location of the retailer from which the ordered items are to be collected. The order management module 220 may also assign an order to a picker based on how many items are in the order, a vehicle operated by the picker, the delivery location, the picker's preferences on how far to travel to deliver an order, the picker's ratings by customers, or how often a picker agrees to service an order.

In some embodiments, the order management module 220 determines when to assign an order to a picker based on a delivery timeframe requested by the customer with the order. The order management module 220 computes an estimated amount of time that it would take for a picker to collect the items for an order and deliver the ordered item to the delivery location for the order. The order management module 220 assigns the order to a picker at a time such that, if the picker immediately services the order, the picker is likely to deliver the order at a time within the timeframe. Thus, when the order management module 220 receives an order, the order management module 220 may delay in assigning the order to a picker if the timeframe is far enough in the future.

When the order management module 220 assigns an order to a picker, the order management module 220 transmits the order to the picker client device 110 associated with the picker. The order management module 220 may also transmit navigation instructions from the picker's current location to the retailer location associated with the order. If the order includes items to collect from multiple retailer locations, the order management module 220 identifies the retailer locations to the picker and may also specify a sequence in which the picker should visit the retailer locations.

The order management module 220 may track the location of the picker through the picker client device 110 to determine when the picker arrives at the retailer location. When the picker arrives at the retailer location, the order management module 220 transmits the order to the picker client device 110 for display to the picker. As the picker uses the picker client device 110 to collect items at the retailer location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the customer client device 100 that describe which items have been collected for the customer's order.

In some embodiments, the order management module 220 tracks the location of the picker within the retailer location. The order management module 220 uses sensor data from the picker client device 110 or from sensors in the retailer location to determine the location of the picker in the retailer location. The order management module 220 may transmit to the picker client device 110 instructions to display a map of the retailer location indicating where in the retailer location the picker is located. Additionally, the order management module 220 may instruct the picker client device 110 to display the locations of items for the picker to collect, and may further display navigation instructions for how the picker can travel from their current location to the location of a next item to collect for an order.

The order management module 220 determines when the picker has collected all of the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the retailer location to the delivery location, or to a subsequent retailer location for further item collection. The order management module 220 tracks the location of the picker as the picker travels to the delivery location for an order, and updates the customer with the location of the picker so that the customer can track the progress of their order. In some embodiments, the order management module 220 computes an estimated time of arrival for the picker at the delivery location and provides the estimated time of arrival to the customer.

In some embodiments, the order management module 220 facilitates communication between the customer client device 100 and the picker client device 110. As noted above, a customer may use a customer client device 100 to send a message to the picker client device 110. The order management module 220 receives the message from the customer client device 100 and transmits the message to the picker client device 110 for presentation to the picker. The picker may use the picker client device 110 to send a message to the customer client device 100 in a similar manner.

The order management module 220 coordinates payment by the customer for the order. The order management module 220 uses payment information provided by the customer (e.g., a credit card number or a bank account) to receive payment for the order. In some embodiments, the order management module 220 stores the payment information for use in subsequent orders by the customer. The order management module 220 computes a total cost for the order and charges the customer that cost. The order management module 220 may provide a portion of the total cost to the picker for servicing the order, and another portion of the total cost to the retailer.

The machine learning training module 230 trains machine learning models used by the online concierge system 140. The online concierge system 140 may use machine learning models to perform functionalities described herein. Example machine learning models include regression models, support vector machines, naïve bayes, decision trees, k nearest neighbors, random forest, boosting algorithms, k-means, and hierarchical clustering. The machine learning models may also include neural networks, such as perceptrons, multilayer perceptrons, convolutional neural networks, recurrent neural networks, sequence-to-sequence models, generative adversarial networks, or transformers.

Each machine learning model includes a set of parameters. A set of parameters for a machine learning model are parameters that the machine learning model uses to process an input. For example, a set of parameters for a linear regression model may include weights that are applied to each input variable in the linear combination that comprises the linear regression model. Similarly, the set of parameters for a neural network may include weights and biases that are applied at each neuron in the neural network. The machine learning training module 230 generates the set of parameters for a machine learning model by "training" the machine learning model. Once trained, the machine learning model uses the set of parameters to transform inputs into outputs.

The machine learning training module 230 trains a machine learning model based on a set of training examples. Each training example includes input data to which the machine learning model is applied to generate an output. For example, each training example may include customer data, picker data, item data, or order data. In some cases, the training examples also include a label which represents an expected output of the machine learning model. In these cases, the machine learning model is trained by comparing its output from input data of a training example to the label for the training example.

The machine learning training module 230 may apply an iterative process to train a machine learning model whereby the machine learning training module 230 trains the machine learning model on each of the set of training examples. To train a machine learning model based on a training example, the machine learning training module 230 applies the machine learning model to the input data in the training example to generate an output. The machine learning training module 230 scores the output from the machine learning model using a loss function. A loss function is a function that generates a score for the output of the machine learning model such that the score is higher when the machine learning model performs poorly and lower when the machine learning model performs well. In cases where the training example includes a label, the loss function is also based on the label for the training example. Some example loss functions include the mean square error function, the mean absolute error, hinge loss function, and the cross entropy loss function. The machine learning training module 230 updates the set of parameters for the machine learning model based on the score generated by the loss function. For example, the machine learning training module 230 may apply gradient descent to update the set of parameters.

In various embodiments, the machine learning training module 230 trains a classification model that determines categories for items offered by a retailer, as further described below in conjunction with FIGS. 3 and 4. Additionally, the machine learning training module 230 trains an outcome model that generates predicted outcomes for categories based on a pricing model applied to the categories. As further described below in conjunction with FIGS. 3 and 5, the outcome represents an amount of revenue, an amount of items sold, or other outcome to the retailer from fulfillment of orders, and a pricing policy specifies an amount by which prices items are increased by the online concierge system 140 from their prices offered by the retailer. The outcome model allows the online concierge system 140 to evaluate application of different pricing policies to various categories on outcomes from orders. As further described below in conjunction with FIGS. 3 and 6, the machine learning training module 230 also trains a price adjustment model that modifies one or more pricing policies applied to categories so application of pricing policies to different categories satisfies one or more constraints, such as a constraint that an average markup applied to items across different categories equals a specific markup specified by the constraint.

The data store 240 stores data used by the online concierge system 140. For example, the data store 240 stores customer data, item data, order data, and picker data for use by the online concierge system 140. The data store 240 also stores trained machine learning models trained by the machine learning training module 230. For example, the data store 240 may store the set of parameters for a trained machine learning model on one or more non-transitory, computer-readable media. The data store 240 uses computer-readable media to store data, and may use databases to organize the stored data.

Figure 3:
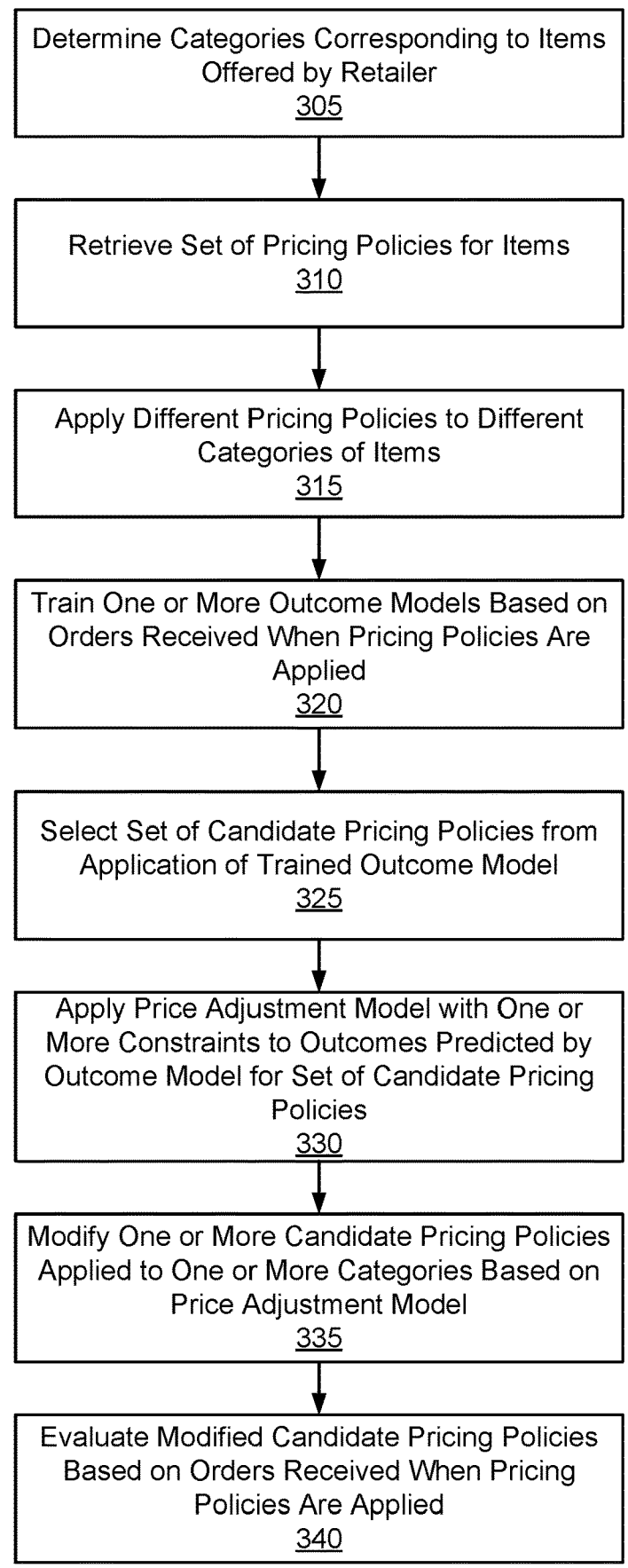
FIG. 3 illustrates a flowchart for a method for selecting a combination of pricing policies and categories for items offered by a retailer, in accordance with one or more embodiments.

FIG. 3 is a illustrates a flowchart of one embodiment of a method for selecting a combination of pricing policies and categories for items offered by a retailer Alternative embodiments may include more, fewer, or different steps from those illustrated in FIG. 3, and the steps may be performed in a different order from that illustrated in FIG. 3. These steps may be performed by an online concierge system (e.g., online concierge system 140). Additionally, each of these steps may be performed automatically by the online concierge system 140 without human intervention.

The online concierge system 140 determines 305 a category for various items offered by a retailer through the online concierge system 140. In various embodiments, the online concierge system 140 determines 305 a category for an item based on item data included in the data store 240. For example, the data store 240 includes information describing a taxonomy that describes a hierarchy of items, with higher levels in the taxonomy including more generalized attributes of an item, and lower levels of the taxonomy including more specific attributes of items. In some embodiments, a lowest level in the taxonomy identifies specific items, while a higher level of the taxonomy specifies a category that includes one or more specific items.

In some embodiments, to determine 305 a category for an item, the online concierge system 140 selects an item and applies a trained substitution model to the item. The trained substitution model receives an item as input and outputs one or more additional items. The additional items are items that one or more users included in orders to replace the item. In various embodiments, the online concierge system 140 trains the trained substitution model using training examples from previously received orders. A training example includes the item and a label identifying an additional item that a user included in a prior order. The machine learning training module 230 of the online concierge system 140 iteratively trains the trained substitution model using training examples, as further described above in conjunction with FIG. 2, with the trained substitution model stored by the online concierge system 140 after training.

The online concierge system 140 applies the trained substitution model to different items and generates a graph including connections between an item and one or more additional items output by the trained substitution module. This results in a substitution graph where a connection between an item and an additional item indicates that the item can be replaced by the additional item and vice versa. In some embodiments, the online concierge system 140 stores the substitution graph in the data store 240, simplifying identification of one or more items capable of being substituted for an item. The online concierge system 140 applies one or more nearest neighbor methods to an item and to the substitution graph, with a result of a nearest neighbor method identifying additional items that are nearest to the item in the substitution graph. Applying the one or more nearest neighbor methods to different items in the substitution graph allows the online concierge system 140 to generate different groups of items, with an identifier of a group including an item comprising a category for the item. This allows the online concierge system 140 to determine 305 a category for an item from prior orders received from users, allowing the category to reflect user perception of items in different orders.

In other embodiments, the online concierge system 140 trains a model to determine 305 categories for items for a retailer based on one or more criteria specified by the retailer. In various embodiments, the online concierge system 140 uses the taxonomy of items maintained by the online concierge system 140 and an objective of the retailer for the categories to determine 305 a category for different items. This allows the determination of a category for an item to be specific to a retailer, allowing the categorization of items to be tailored to different retailers. The objective specified by the retailer specifies one or more attributes of a category, with a combination of attributes of items in a category comprising an attribute for the categories. For example, a retailer objective specifies a percentage of gross merchandise value to allocate for each category, so a trained classification model outputs categories so a combined gross merchandise value from items in a category divided by an aggregate gross merchandise value across all items is the specified percentage or is within a threshold amount of the specified percentage. In various embodiments, the model receives the taxonomy maintained by the online concierge system 140, prior orders fulfilled from the retailer during a specific time interval (e.g., two months of orders fulfilled from the retailer), and a specified percentage of gross merchandise value for each category (or other objective for each category). The machine learning training module 230 of the online concierge system 140 iteratively trains a classification model using training examples from the prior orders fulfilled from the retailer during the specific time interval, as further described above in conjunction with FIG. 2, with the trained classification model stored by the online concierge system 140. Application of the classification results in a set of categories for the retailer that each include one or more items so each category satisfies the objective of the retailer. In an example where the classification model receives a specified percentage of gross merchandise value as an objective, the classification model outputs categories where an aggregate gross merchandise value of items in each category divided by a total gross merchandise value of items across all categories is within a threshold amount of the specified percentage of gross merchandise value. The preceding example results in categories that each have approximately equal percentage of a total gross merchandise value to the retailer, allowing the determined categories to account for retailer-specific market share of different items.

Figure 4:
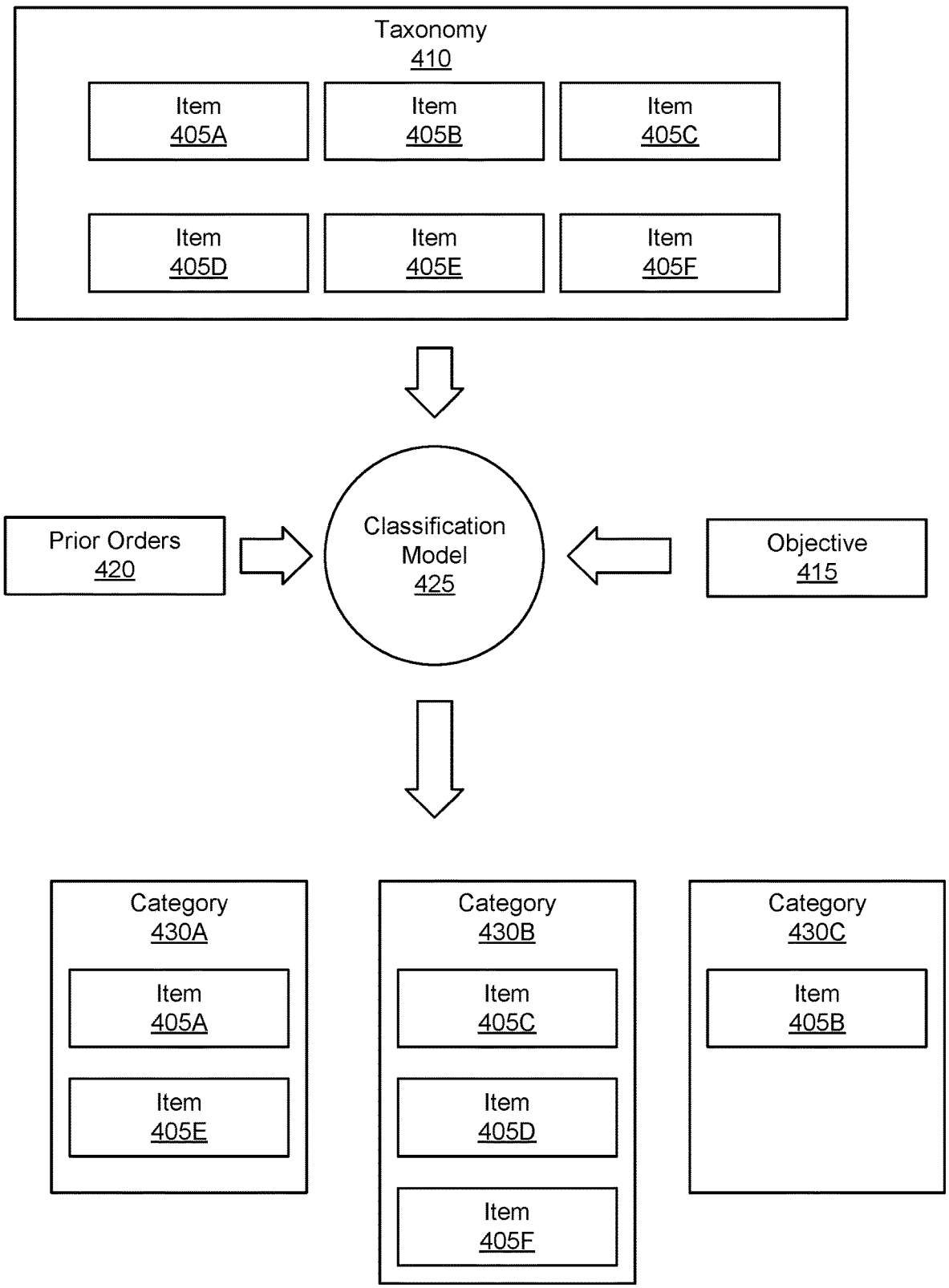
FIG. 4 illustrates a process flow diagram of an example determination of categories for items offered by a retailer, in accordance with one or more embodiments.

For purposes of illustration, FIG. 4 shows a process flow diagram of an example determination of categories for items offered by a retailer. In the example shown by FIG. 4, a retailer offers items 405A-405F (also referred to individually and collectively using reference number 405). The online concierge system 140 obtains information describing each item 405. Example information describing an item 405 includes an item identifier uniquely identifying the item 405 and attributes of the item 405. In some embodiments, the online concierge system 140 obtains the information describing items 405 from the data store 240, while in other embodiments the online concierge system 140 obtains information describing items 405 from a server of a retailer.

The online concierge system 140 obtains a taxonomy 410 describing a hierarchy of items, with higher levels in the taxonomy including more generalized attributes of an item, and lower levels of the taxonomy including more specific attributes of items, as further described above in conjunction with FIG. 3. In various embodiments, the online concierge system 140 maintains the taxonomy 410. However, in other embodiments the online concierge system 140 obtains the taxonomy from the retailer or from another entity. In the example shown by FIG. 4, the taxonomy 410 includes information describing individual items 405 offered by the retailer. In other embodiments, the online concierge system 140 separately obtains the taxonomy 410 and information describing items 405 offered by the retailer.

The online concierge system 140 also receives an objective 415 from the retailer. Alternatively, an administrator of the online concierge system 140 may define objective 415 internally to meet certain policy objectives. The objective 415 specifies one or more attributes for categories associated with items, as further described above in conjunction with FIG. 3. For example, an objective specifies an attribute for a category, so a combination of items included in a category satisfies the objective 415. For example, an objective 415 specifies a percentage of a gross merchandise value for the retailer for each category. As an example, the objective 415 specifies a number of categories and a percentage of gross merchandise value for each category. In the preceding example, categories are associated with items 405 so an aggregate value of items in a category is the specified percentage of gross merchandise value across all items. A different characteristic or combination of characteristics may be specified for a category in various embodiments. Specifying a number of categories as an objective 415 allows the retailer to tailor a number of categories into which items are classified, enabling different numbers of categories to be used for association with items in different embodiments or for different retailers.

In the example shown by FIG. 4, the online concierge system 140 also obtains information describing prior orders 420 fulfilled by the retailer. In some embodiments, the online concierge system 140 identifies orders fulfilled by the retailer during a specific time period. For example, the prior orders 420 are orders fulfilled from the retailer for two months prior to a time when categories are determined for items. Information describing a prior order 420 includes items included in the prior order, a price of each item included in the prior order, a number of each item included in the prior order, and a total price of the prior order. In other embodiments, other information describes a prior order.

From the taxonomy 410, which includes information identifying items 405, the objective 415, and the prior orders 420, a classification model 425 applied by the online concierge system 140 outputs one or more categories 430A, 430B, 430C (also referred to individually and collectively using reference number 430). Each category 430 includes one or more items 405 offered by the retailer, and each category has one or more attributes satisfying the objective 415 received by the classification model 425. In various embodiments, the classification model 425 is trained through application to labeled training examples, as further described above in conjunction with FIG. 2. For example, each training example includes a taxonomy 410, an objective 415, and prior orders 420 fulfilled by the retailer, with a label applied to each training example identifying one or more categories. The classification model 425 is trained by application to each training example of a set, with categories 430 output by the classification model 425 from application to a training example compared to the label for the training example. The online concierge system 140 scores the output categories from the classification model 425 model using a loss function that generates a score for the output of the machine learning model based on a comparison of the output categories 430 to the label applied to the training example. The online concierge system 140 updates a set of parameters for the classification model using backpropagation based on the score generated by the loss function.

In the example of FIG. 4, application of the classification model 425 results in category 430A, category 430B, and category 430B. Each category 430 includes items 405 so a combination of item attributes for items within a category 430 satisfies the objective 415. For example, in FIG. 4, category 430A includes item 405A and item 405E, while category 430B includes item 405C, item 405D, and item 405F, and category 430C includes item 405B. The combination of an attribute of item 405A and item 405E causes category 430A to satisfy the objective 415, while the combination of the attribute of item 405C, item 405D, and item 405B results in category 430B satisfying the objective 415. Similarly, the attribute of item 405B causes category 430C to satisfy the objective 415. For example, the objective is a specific percentage of gross merchandise value, so a combination of gross merchandise values for items 405 in a category 430 divided by a gross merchandise value across all items 405 equals the specific percentage. Different objectives 415 may be specified in different embodiments, with the objective 415 affecting categories 430 output by the classification model 425.

Referring back to FIG. 3, the online concierge system 140 retrieves 310 a set of pricing policies for items, with the set including a plurality of different pricing policies. For example, the set of pricing policies includes three different pricing policies, with each pricing policy corresponding to a different amount by which a price of an item is increased or marked up. For example, different pricing policies of the set specify different percentages by which a price of an item by a retailer is increased. For example, a pricing policy of the set specifies a 10% increase, or markup, from a retailer's price of an item, another pricing policy of the set specifies a 5% increase, or markup, from the retailer's price of the item, while an additional pricing policy specifies a 15% increase, or markup, from the retailer's price of the item. However, in other embodiments, the set of pricing policies includes other numbers of distinct pricing policies, with different pricing policies of the set specifying different amounts by which a retailer's price of an item is increased. In various embodiments, a pricing policy specifies a percentage by which a price of an item is increased, while in other embodiments a pricing policy specifies a fixed amount by which a price of an item is increased (e.g., an item's price is increased by 75 cents).

The online concierge system 140 applies 315 pricing policies of the set to a subset of different categories of the items offered by the retailer. When applying 315 the pricing policies, a pricing policy is not applied to an additional subset of categories of items, so prices for items in each of the additional subset of categories are increased according to a pricing policy. In various embodiments, different pricing policies of the set are applied to various categories. For example, the online concierge system 140 randomly applies pricing policies of the set to categories of items. Application of a pricing policy to a category increases the price of items included in the category by a markup specified by the pricing policy. When applying 315 a pricing policy to a category, the online concierge system 140 applies 315 a pricing policy to each item in a category. Application of a pricing policy to each item in a category avoids cross-product elasticity issues caused by different items in a common category having different prices from application of different pricing policies. Application of different pricing policies to different items in a category may cause users to select an item in the category where an applied pricing policy results in a lower price. Applying pricing policies at a category level, rather than at an individual item level, allows evaluation of an applied pricing policy across multiple items in the category, allowing the online concierge system 140 to offset different frequencies with which users purchase different items in a category. This provides the online concierge system 140 with increased data about effects of a pricing policy on order fulfillment.

With pricing policies applied 315 to different categories of items, the online concierge system 140 receives orders from users for the retailer and fulfills orders. Prices of items in a received order are based on a pricing policy applied 315 to a category including the items. In various embodiments, the online concierge system 140 fulfills orders for a particular time interval during which the various pricing policies are applied 315 to various categories for the retailer. This allows the online concierge system 140 to obtain data describing purchases made by users from the retailer when different pricing policies are applied 315. From the orders fulfilled while the different pricing policies are applied 315, the online concierge system 140 trains 320 one or more outcome models that receive one or more categories and corresponding pricing policies applied to categories as input and output a predicted outcome for categories with the corresponding pricing policies applied. In some embodiments, the predicted retailer outcome is a predicted revenue (or a predicted gross merchandise value) from a category or from one or more categories to the retailer when the pricing policy is applied to a category. In various embodiments, an outcome model receives multiple categories as an input along with multiple pricing policies, allowing the outcome model to account for effects of pricing policies applied to different categories on inclusion of items from various categories in orders. In another example, the predicted retailer outcome is a change in predicted revenue to the retailer for each category using the pricing policy relative to a current pricing of items. In various embodiments, the output model receives as input the categories for the retailer, prior order history for each category (e.g., prior orders received during a specific time interval for different categories), the pricing policy for each category, and prior order data including revenue to the retailer from orders with items having a current price. In various embodiments, an outcome model is a regression model that determines the predicted retailer outcome based on the categories for the retailer, prior order history for each category (e.g., prior orders received during a specific time interval for different categories), the pricing policy for each category, and prior order data including revenue to the retailer from orders with items having a current price.

In various embodiments, the machine learning training module 230 of the online concierge system 140 iteratively trains the outcome model based on training examples determined from orders fulfilled from the retailer using the prices for items in categories determined by pricing policies applied 315 to the categories. For example, a training example includes a combination of categories and a pricing policy corresponding to each category, with a label applied to a training example identifying pairs each including a category and an amount of revenue received from items of the category with prices specified by the pricing policy. This training of the outcome model using received orders from users when different pricing policies were applied to categories, allows the online concierge system 140 to leverage application of a pricing policy to categories of a subset of categories to generate training examples used to train the one or more outcome models. Applying the pricing policies to categories, rather than to individual items, increases the amount of data from which the training examples are created by aggregating information from orders across different items in a common category.

Figure 5:
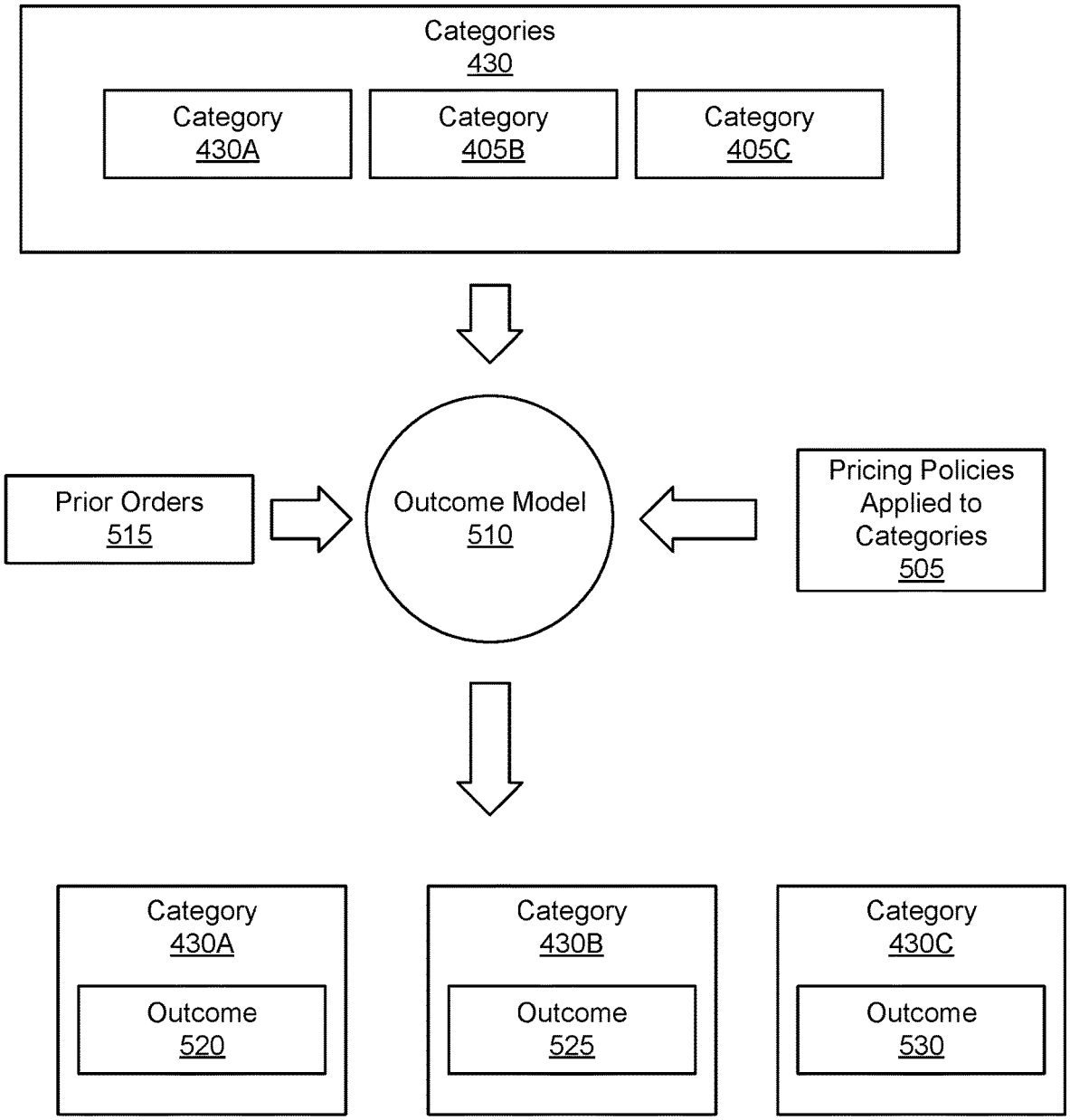
FIG. 5 illustrates a process flow diagram of an example application of an outcome model to combinations of categories and pricing models, in accordance with one or more embodiments.

For purposes of illustration, FIG. 5 shows a process flow diagram of an example application of an outcome model to combinations of categories and pricing models. The example shown by FIG. 5 includes category 430A, category 430B, and category 430C (also referred to individually and collectively using reference number 430) from FIG. 4 as categories for a retailer. However, in other embodiments, other numbers of categories 430 are used by the retailer.

As further described above in conjunction with FIG. 3, the online concierge system 140 applies different pricing policies 505 to categories 430 of the retailer. A pricing policy 505 applied to a category 430 specifies a markup, or an increase, of a price of an item included in the category 430 and offered by a retailer by the online concierge system 140. As further described above in conjunction with FIG. 3, the online concierge system 140 may apply different pricing policies 505 to different categories, so prices of items in different categories 430 are increased by different amounts. The online concierge system 140 retrieves associations between pricing policies and categories 430 to which pricing policies are applied.

As further described above in conjunction with FIG. 3, the online concierge system 140 applies different pricing policies 505 to different categories 430 and fulfills orders from users placed with the pricing policies 505 applied to different categories 430, with the orders fulfilled by the online concierge system 140 during a time interval when the pricing policies 505 were applied to different categories 430 used to train an outcome model 510. In various embodiments, the online concierge system 140 trains the outcome model 510 through application to labeled training examples generated from orders fulfilled while pricing policies 505 were applied to categories 430 of items, as further described above in conjunction with FIG. 2. For example, each training example includes one or more categories 430 of items included in an order, pricing policies 505 applied to the categories 430 in the order, and information describing prior orders 515 fulfilled from the retailer. A label is applied to a training example, with the label identifying an outcome corresponding to each category 430 in the training example.

For example, an outcome is an amount of revenue obtained from a category 430, so the label includes pairs of categories 430 and outcomes, with a pair including a category 430 and a corresponding amount of revenue from items in the category 430. The outcome model 510 is trained by application to each training example of a set, with the outcome model 510 outputting combinations including a category 430 and an outcome corresponding to the category 430. The online concierge system 140 scores the output of the outcome model 510 using a loss function that generates a score for the output of the machine learning model based on a comparison of the output combinations of categories 430 and corresponding outcomes with the label applied to the training example. The online concierge system 140 updates a set of parameters for the classification model using backpropagation, or one or more other methods, based on the score generated by the loss function.

The online concierge system 140 applies the trained outcome model 510 to inputs comprising the categories 430 of items for the retailer, pricing policies 505 applied to corresponding categories 430, and information describing prior orders 515 fulfilled from the retailer. For example, the online concierge system 140 applies the outcome model 510 to category 430A, category 430B, and category 430C, a corresponding pricing policy 505 applied to each of category 430A, category 430B, and category 430C, and to information describing prior orders 515 fulfilled from the retailer. In various embodiments, the information describing prior orders 515 fulfilled from the retailer describes a frequency with which items from different categories were included in prior orders, a number of items from each of the categories included in prior orders, revenue generated from different categories based on orders received before one or more pricing policies 505 were applied to categories, and items included in orders received before application of the one or more pricing policies 505. However, different or additional data describing prior orders 515 is received by the outcome model 510 in various embodiments.

The outcome model 510 outputs a predicted (or expected) outcome for each category 430. In the example of FIG. 5, the outcome model 510 outputs outcome 520 for category 430A, outcome 525 for category 430B, and outcome 530 for category 430C. In various embodiments, an outcome is an amount of revenue received for a category 430 when a corresponding pricing policy 505 is applied to the category 430. In such embodiments, the output of the outcome model 510 specifies a predicted amount of revenue received when a particular pricing policy 505 is applied to a category 430. For example, an outcome is a gross merchandise value for a category 430, so the outcome model 510 outputs a predicted gross merchandise value for the category 430 when a pricing policy 505 specified by an input to the outcome model 510 is applied to the category 430. In various embodiments, the online concierge system 140 applies the outcome model 510 to different combinations of categories 430 and pricing policies 505 to generate predicted outcomes when different pricing policies 505 are applied to different categories 430. Applying the outcome model 510 to a combination of categories 430 and corresponding pricing policies 505 allows the outcome model 510 to predict an outcome for a category 430 that accounts for effects of pricing policies 505 to one or more other categories 430 on the outcome for the category 430.

Referring back to FIG. 3, the online concierge system 140 applies a trained outcome model to different combinations of categories and pricing policies. Based on application of the one or more trained outcome models to combinations of pricing policies and categories, the online concierge system 140 selects 325 a set of combinations of categories and pricing policies. The set includes pairs that each include a category and a corresponding pricing policy applied to the category. For example, the set of combinations of categories and pricing policies includes a pricing policy for each of a set of categories that results in a maximum predicted outcome (e.g., a maximum revenue) for a corresponding category. In other embodiments, the set of combinations of categories and pricing policies includes pricing policies resulting in a maximum combination of predicted outcomes across multiple categories. For example, the set of combinations of categories and pricing policies includes a pricing policy for each category of a set where a sum of predicted outcomes across the categories is maximized. In an example, the online concierge system 140 selects a pricing policy for each category that results in a maximum predicted outcome for a corresponding category, with the set of combinations of categories and pricing policies including the selected pricing policies. This allows the online concierge system 140 to select combinations of categories and pricing policies for further evaluation by leveraging orders including items in one or more categories where pricing policies were applied to predict retailer outcomes for different pricing policies, reducing a number of combinations of categories and pricing policies considered by the online concierge system 140.

While the set of combinations of categories and pricing policies identifies pricing policies optimizing an objective, such as a gross merchandise value or an amount of revenue, for different categories, the online concierge system 140 enforces one or more constraints to application of pricing policies across categories. For example, the one or more constraints prevent a retailer from losing revenue across multiple categories from the pricing policies applied to different categories. For example, a constraint enforced by the online concierge system 140 specifies an average markup across categories to remain fixed. In some embodiments, the average markup constraint is weighted by a revenue obtained from items in a category, so a markup applied to a category by a pricing policy is weighted based on an amount of revenue the retailer receives from items of the category. Enforcing the one or more constraints allows the online concierge system 140 to prevent application of one or more pricing policies from reducing revenue to the retailer.

To enforce the one or more constraints for the set of combinations of categories and pricing policies, the online concierge system 140 applies 330 a price adjustment model including the one or more constraints to outcomes predicted by the outcome model for each category based on a pricing policy corresponding to a category and revenue to the retailer from each category based on its corresponding pricing policy. In some embodiments, the revenue to the retailer for a category is specified as a percentage of revenue to the retailer generated by the category. In some embodiments, the price adjustment model also receives as input a number of categories for which the markup is to be changed. As the price adjustment model outputs changes to pricing policies applied to one or more categories, specifying the number of categories for which a corresponding policy is capable of being modified allows the retailer to regulate a number of pricing policies capable of being modified. The trained price adjustment model outputs one or more categories with corresponding modifications to a pricing policy applied to a category. For example, a price adjustment model outputs a category and an amount by which a markup specified by the pricing policy applied to the category is to be increased or is to be decreased. In some embodiments, a modification to a pricing policy applied to a category is identified as a percentage change for the markup specified by the pricing policy, while in other embodiments, the modification to a pricing policy applied to a category is specified as a specific amount. In various embodiments, the output of the price adjustment model identifies one or more categories and one or more corresponding increases to pricing policies applied to the one or more categories and one or more additional categories along with one or more decreases to pricing policies applied to the additional categories. In various embodiments, the price adjustment model is a mixed-integer linear programming process using the retailer outcomes predicted by the outcome model for each category as rewards and applies one or more constraints on the markups across categories, for example, the price adjustment model maintains a constraint that an average markup across categories, weighted by revenue from corresponding categories, is fixed. The price adjustment model is iteratively trained from training examples, as further described above in conjunction with the machine learning training module 230, further described above in conjunction with FIG. 2.

Based on the output of the price adjustment model, the online concierge system 140 modifies 335 one or more pricing policies included in the set of combinations of categories and pricing policies. For example, the online concierge system 140 increases a markup of a pricing policy applied to a category by an amount specified by the output of the price adjustment model for the category. In another example, the online concierge system 140 decreases a markup of a pricing policy applied to a category by an amount specified by the output of the price adjustment model for the category. The online concierge system 140 increases a markup applied to one or more categories by corresponding pricing policies and decreases a markup applied to one or more other categories by corresponding pricing policies in various embodiments. Modifying markups specified by different pricing policies applied to different categories allows the online concierge system 140 to maintain a fixed value for an average markup across each category weighted by revenue from categories (or to satisfy another constraint), while enabling different categories of items to have different markups. Such category-specific markups may allow the online concierge system 140 to optimize revenue from order fulfillment without decreasing revenue to the retailer from the orders.

Figure 6:
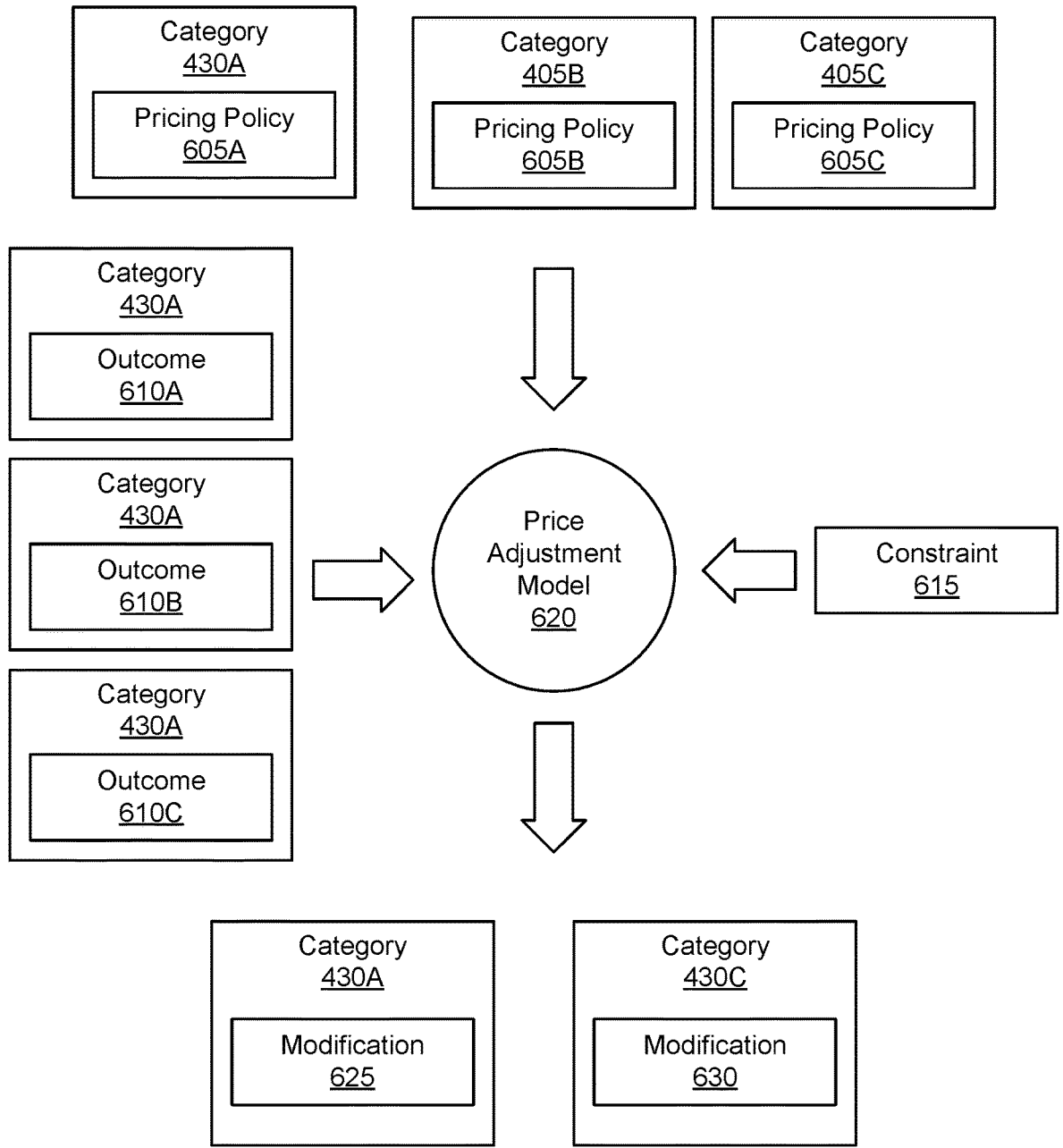
FIG. 6 illustrates a process flow diagram of an example modification of pricing policies applied to categories of a retailer, in accordance with one or more embodiments.

FIG. 6 shows a process flow diagram of an example modification of pricing policies applied to categories of a retailer. The example shown by FIG. 6 includes category 430A, category 430B, and category 430C (also referred to individually and collectively using reference number 430) from FIG. 4 as categories for a retailer. However, in other embodiments, other numbers of categories 430 are used by the retailer.

As shown in FIG. 6, each category 430 is associated with a corresponding pricing policy 605A-C (also referred to individually and collectively using reference number 605). Pricing policy 605A is applied to category 430A, while pricing policy 605B is applied to category 430B. Similarly, pricing policy 605C is applied to category 430C. As further described above in conjunction with FIG. 3, a pricing policy 605 applied to a category 430 results in a maximum objective for the category 430 or a maximum combination of objectives across multiple categories 430. In one example, pricing policy 605A results in a maximum value of an objective for category 430A based on application of the outcome model 510 further described above in conjunction with FIGS. 3 and 5. Similarly, pricing policy 605B and pricing policy 605B result in a maximum value of the objective for category 430B and 430C, respectively, from the outcome model 510. In other examples, application of pricing policies 605A-C to categories 430A-C results in a maximum combination of objectives across the categories 430 (e.g., a maximum some of an outcome output by the outcome model 510 for category 430A, category 430B, and category 430C).

Additionally, the online concierge system 140 retrieves an objective 610A, 610B, 610C (also referred to individually and collectively using reference number 610) determined for each category 430 when the corresponding pricing policy 605 is applied from the outcome model 510. In the example of FIG. 6, the outcome model 510 outputs outcome 610A for category 430A when pricing policy 605A is applied to category 430A. Similarly, outcome 610B is determined for category 430B when pricing policy 605B is applied to category 430B, and outcome 610C is determined for category 430C when pricing policy 605C is applied to category 430C. Retrieving the objective determined for each category 430 with the corresponding pricing policy applied 605 allows the online concierge system 140 to evaluate predicted performance of the combination of pricing policies 605 and categories 430 by leveraging the trained outcome model 510. In addition to the outcome 610 corresponding to each category 430, an allocation outcome 610 for each category 430 is obtained. For example, the allocation of an outcome 610 for category 430 is a ratio of the outcome 610 for the category 430 to an aggregation of outcomes 610 across categories 430.

The online concierge system 140 applies a price adjustment model 620 to the outcomes 610 for the combinations of categories 430 and pricing models 605, with the price adjustment model 620 enforcing a constraint 615 across multiple categories 430. In some embodiments, the constraint 615 is received as an input to the price adjustment model 620, while in other embodiments the constraint 615 is a parameter comprising the price adjustment model 620. For example, the constraint 615 is a specific average markup applied across categories 430. Having the constraint 615 specify an average markup allows the combination of pricing policies 605 and categories 430 to approximate application of a common markup across all categories. Such a constraint allows the combinations of categories 430 and corresponding pricing policies 605 to average to a specific markup across categories that equals or is within a threshold amount of a specific markup for the retailer as a whole. In various embodiments, the constraint 615 weights a markup from a pricing policy 605 applied to a category 430 by a ratio of the objective 610 (e.g., revenue, gross merchandise value) for the retailer for the category 430 to a sum of objectives 610 for each category 430.

The price adjustment model 620 is trained through application to labeled training examples, as further described above in conjunction with FIG. 2. For example, each training example includes one or more categories 430, objectives 610 corresponding to each category of items included in an order, and an allocation of combined objectives 610 across categories 430 for each category 430. A label identifying modifications to one or more pricing policies 605 applied to categories 430 is applied to a training example. The price adjustment model 620 is trained by application to each training example of a set, with the price adjustment model 620 outputting modifications to pricing policies applied to one or more of the categories 430. For example, the price adjustment model 620 outputs one or more combinations of a category 430 and an adjustment to a pricing policy corresponding to the category 430. The online concierge system 140 scores the output of the price adjustment model 620 using a loss function that generates a score for the output of the price adjustment model 620 based on a comparison of the output combinations of the price adjustment model 620 for a training example and the label applied to the training example. The online concierge system 140 updates a set of parameters for the price adjustment model 620 using backpropagation, or one or more other methods, based on the score generated by the loss function.

In the example of FIG. 6, application of the price adjustment model 620 to the outcomes 610 for the categories 430 with the corresponding pricing policies 605 applied results in a modification 625 to pricing policy 605A applied to category 430A and an additional modification 630 to pricing policy 630C applied to category 430B. For example, modification 625 specifies an amount by which a markup applied by pricing policy 630A is increased, while modification 630 specifies an amount by which a markup applied by pricing policy 630C is decreased. Modification 625 and modification 630 specify different amounts in various embodiments, or modification 625 and modification 630 specify a common amount in some embodiments. The modifications output by the price adjustment model 620 specify modifications to one or more pricing policies 605 so application of pricing policies 605 across multiple categories satisfies the constraint 615. For example, the price adjustment model 620 outputs modifications to one or more pricing policies applied to one or more categories 430 so an average markup from pricing policies applies to multiple categories 430, or an average markup from pricing policies applies to multiple categories 430 weighted by ratio of an outcome 610 for a category to a sum of outcomes 610 for all categories, is a value specified by the constraint 615.

Referring back to FIG. 3, The online concierge system 140 evaluates 340 the modified pricing policies applied to the categories by leveraging orders that were fulfilled during the particular time interval when various pricing policies were applied 315 to various categories. In various embodiments, the online concierge system 140 applies the trained outcome model to a combination of modified pricing policies and categories included in a previously received order to generate a predicted outcome for the previously received order with the modified pricing policies applied to corresponding categories of the previously received order. The online concierge system 140 evaluates 340 the modified candidate pricing policies by comparing an outcome from the previously received order to the predicted outcome for the previously received order.

To evaluate 340 the modified pricing policies applied to the categories, the online concierge system 140 determines a distance metric between markups for categories specified by the modified pricing policies for the previously received order and pricing policies applied 315 to categories when the previously received order was received. The distance metric quantifies the distance between the pricing policies 315 that were applied when the previously received order was received and the modified pricing policies. In some embodiments, the distance metric is a sum across categories included in the previously received order of differences between a price specified by the modified pricing policy for an item of a category included in the previously received order and a price of the item of the category when the previously received order was received. In another example, the distance metric is a sum across categories included in the previously received order of squared differences between a price of an item of a category specified by the modified pricing policy for the category included in the previously received order and a price of the item of the category when the previously received order was received. As another example, the distance metric is a number of times a price of an item included in the previously received order specified by the modified pricing policy for the category equals a price of the item when the previously received order was received. In various embodiments, the online concierge system 140 uses different functions to determine the distance metric between prices of items determined from the modified pricing policies for the previously received order and prices of items determined from a pricing policy applied 315 to categories when the previously received order was received. In some embodiments, the function determining the distance metric accounts for revenue the retailer obtains from different categories by weighting a value for a category (e.g., a difference between a price of an item from a modified pricing policy and a price of the item when the previously received order was received) by a percentage of revenue the retailer obtains from the category. The function determining the distance metric is generated so a smaller distance metric between an outcome of a previously received order and a predicted outcome of the previously received order with the one or more modified pricing policies applied corresponds to a higher outcome of the previously received order. Hence, when prices of the items in the previously received order are closer to the prices corresponding to application of the one or more modified pricing policies, the outcome of the previously received order is closer to the predicted outcome when the one or more modified pricing policies were applied.

Defining the distance function for evaluation allows the online concierge system 140 to counterfactually evaluate the set of pricing policies including one or more modified pricing policies without running dedicated experiments with users to test the set of pricing policies including one or more modified pricing policies by leveraging previously obtained data describing orders fulfilled for users when various pricing policies were applied to categories of items. As a limited number of previously received orders, or no previously received orders, include the combination of markups specified by the modified pricing policies, the online concierge system 140 has limited data for evaluating the particular combination of markups specified by the modified pricing policies. Determination of the distance function allows the online concierge system 140 to leverage an increased number of previously received orders having different combinations of markups than the combination of markups specified by the modified pricing policies to evaluate 340 completion of objectives from orders when then combination of markups specified by the modified pricing policies are applied to categories.

In various embodiments, the online concierge system 140 determines a relationship between the distance metric for markups for a category specified by a modified pricing policy for the previously received order and the pricing policies applied 315 to categories when the previously received order was received and retrains or updates the price adjustment model or the outcome model based on the determined relationship. For example, if the relationship between the distance metric for markups for a category specified by a modified pricing policy for the previously received order and the pricing policies applied 315 to categories when the previously received order was received satisfies one or more criteria indicating less than a threshold correlation between the outcome from the previously received order and the outcome predicted for the previously received order from the outcome model, the online concierge system 140 adjusts the modifications to one or more pricing policies or retrains the outcome model or the price adjustment model.

Additional Considerations

The foregoing description of the embodiments has been presented for the purpose of illustration; many modifications and variations are possible while remaining within the principles and teachings of the above description. Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine learning models in the performance of their described functionalities. A "machine learning model," as used herein, comprises one or more machine learning models that perform the described functionality. Machine learning models may be stored on one or more computer-readable media with a set of weights. These weights are parameters used by the machine learning model to transform input data received by the model into output data. The weights may be generated through a training process, whereby the machine learning model is trained based on a set of training examples and labels associated with the training examples. The training process may include: applying the machine learning model to a training example, comparing an output of the machine learning model to the label associated with the training example, and updating weights associated for the machine learning model through a back-propagation process. The weights may be stored on one or more computer-readable media, and are used by a system when applying the machine learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or." For example, a condition "A or B" is satisfied by any one of the following: A is true (or present) and B is false (or not present), A is false (or not present) and B is true (or present), and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method comprising, at a computer system comprising a processor and a computer-readable medium:
    receiving, from a user interface presented on a client device, a request to view a target item for inclusion into an order being placed by a customer associated with the client device;
    receiving a definition of a plurality of categories, each category containing a different set of items offered by a retailer;
    storing a pricing policy from a plurality of pricing policies for each category, wherein the pricing policy for each category determines a markup to be applied to a retailer price for each of the items that are included in the category;
    retrieving an outcome model that is a machine-learning model trained to predict an outcome when a particular pricing policy is applied to a particular category, wherein the outcome model is trained by a process comprising:
        generating a plurality of training examples from data about orders previously fulfilled, each training example including (1) a combination of a pricing policy and a category to which the pricing policy was applied and (2) a label corresponding to an outcome when the pricing policy was applied to the category;
        applying the outcome model to each training example of the plurality of training examples to generate predicted outcomes for each of the plurality of training examples;
        scoring the predicted outcomes for the training examples using a loss function and the labels of the corresponding training examples; and
        updating one or more parameters of the outcome model by backpropagation based on the scoring;
    applying the trained outcome model to multiple different assignments of a pricing policy from the plurality of pricing policies for each of the plurality of categories, wherein applying the trained outcome model generates a predicted outcome for each of the multiple different assignments;
    selecting an assignment of a pricing policy for each of the plurality of categories from the multiple different assignments based on the predicted outcomes;
    modifying the stored pricing policies to correspond to the selected assignment of a pricing policy for each of the plurality of categories; and
    in response to the request received from the user interface presented on the client device to view the target item of the plurality of items, presenting on the user interface of the client device a price associated with the target item by applying the markup corresponding to the stored pricing policy for the category that contains the target item to the retailer price of the target item.

2. The method of claim 1, wherein selecting the set of combinations of categories and pricing policies from application of the trained outcome model to different combinations of pricing policies applied to categories comprises:
selecting the set of combinations of categories and pricing policies to include a pricing policy for each category resulting in a maximum predicted outcome for a corresponding category.

3. The method of claim 1, wherein selecting the set of combinations of categories and pricing policies from application of the trained outcome model to different combinations of pricing policies applied to categories comprises:
selecting a pricing policy for each category of the set where a sum of predicted outcomes across the categories is maximized.

4. The method of claim 1, wherein selecting an assignment of a pricing policy for each of the plurality of categories from the multiple different assignments based on the predicted outcomes comprises applying a constraint to achieve an average markup across the plurality of categories.

5. The method of claim 4, wherein the average markup across each category is determined by weighting a markup applied to each category of the set by a revenue from a corresponding category.

6. The method of claim 1, further comprising:
retrieving a previously received order;
applying the outcome model to a combination of the modified pricing policies and categories included in the previously received order to generate a predicted outcome for the previously received order; and
determining a distance metric between the predicted outcome for the previously received order and an outcome from the previously received order based on prices for items in categories from the modified pricing policies and prices for items in corresponding categories in the previously received order.

7. The method of claim 6, wherein the distance metric comprises a number of times a price for an item in the previously received order determined by the modified pricing policies matched a price for the item in the previously received order.

8. The method of claim 6, wherein the distance metric comprises a sum of differences between a price for an item in the previously received order determined by the modified pricing policies and a price for the item in the previously received order.

9. The method of claim 1, further comprising:
receiving, from the user interface presented on the client device, input to include the target item into the order being placed by the customer;
retraining the outcome model based on the input to include the target item as an outcome for the markup.

10. A computer program product comprising a non-transitory computer readable storage medium having instructions encoded thereon that, when executed by a processor, cause the processor to perform steps comprising:
receiving, from a user interface presented on a client device, a request to view a target item for inclusion into an order being placed by a customer associated with the client device;
receiving a definition of a plurality of categories, each category containing a different set of items offered by a retailer;
storing a pricing policy from a plurality of pricing policies for each category, wherein the pricing policy for each category determines a markup to be applied to a retailer price for each of the items that are included in the category;
retrieving an outcome model that is a machine-learning model trained to predict an outcome when a particular pricing policy is applied to a particular category, wherein the outcome model is trained by a process comprising:
generating a plurality of training examples from data about orders previously fulfilled, each training example including (1) a combination of a pricing policy and a category to which the pricing policy was applied and (2) a label corresponding to an outcome when the pricing policy was applied to the category;
applying the outcome model to each training example of the plurality of training examples to generate predicted outcomes for each of the plurality of training examples;
scoring the predicted outcomes for the training examples using a loss function and the labels of the corresponding training examples; and
updating one or more parameters of the outcome model by backpropagation based on the scoring;
applying the trained outcome model to multiple different assignments of a pricing policy from the plurality of pricing policies for each of the plurality of categories, wherein applying the trained outcome model generates a predicted outcome for each of the multiple different assignments;
selecting an assignment of a pricing policy for each of the plurality of categories from the multiple different assignments based on the predicted outcomes;
modifying the stored pricing policies to correspond to the selected assignment of a pricing policy for each of the plurality of categories; and
in response to the request received from the user interface presented on the client device to view the target item of the plurality of items, presenting on the user interface of the client device a price associated with the target item by applying the markup corresponding to the stored pricing policy for the category that contains the target item to the retailer price of the target item.

11. The computer program product of claim 10, wherein selecting the set of combinations of categories and pricing policies from application of the trained outcome model to different combinations of pricing policies applied to categories comprises:
selecting the set of combinations of categories and pricing policies to include a pricing policy for each category resulting in a maximum predicted outcome for a corresponding category.

12. The computer program product of claim 10, wherein selecting the set of combinations of categories and pricing policies from application of the trained outcome model to different combinations of pricing policies applied to categories comprises:
selecting a pricing policy for each category of the set where a sum of predicted outcomes across the categories is maximized.

13. The computer program product of claim 10, wherein selecting an assignment of a pricing policy for each of the plurality of categories from the multiple different assignments based on the predicted outcomes comprises applying a constraint to achieve an average markup across the plurality of categories.

14. The computer program product of claim 13, wherein the average markup across each category is determined by weighting a markup applied to each category of the set by a revenue from a corresponding category.

15. The computer program product of claim 10, wherein the non-transitory computer readable storage medium further has instructions encoded thereon that, when executed by the processor, cause the processor to perform steps comprising:
retrieving a previously received order;
applying the outcome model to a combination of the modified pricing policies and categories included in the previously received order to generate a predicted outcome for the previously received order; and
determining a distance metric between the predicted outcome for the previously received order and an outcome from the previously received order based on prices for items in categories from the modified pricing policies and prices for items in corresponding categories in the previously received order.

16. The computer program product of claim 15, wherein the distance metric comprises a number of times a price for an item in the previously received order determined by the modified pricing policies matched a price for the item in the previously received order.

17. The computer program product of claim 15, wherein the distance metric comprises a sum of differences between a price for an item in the previously received order determined by the modified pricing policies and a price for the item in the previously received order.

18. A system comprising:
one or more processors; and
a non-transitory computer readable storage medium having instructions encoded thereon that, when executed by the one or more processors, cause the system to perform steps comprising:
receiving, from a user interface presented on a client device, a request to view a target item for inclusion into an order being placed by a customer associated with the client device;
receiving a definition of a plurality of categories, each category containing a different set of items offered by a retailer;
storing a pricing policy from a plurality of pricing policies for each category, wherein the pricing policy for each category determines a markup to be applied to a retailer price for each of the items that are included in the category;
retrieving an outcome model that is a machine-learning model trained to predict an outcome when a particular pricing policy is applied to a particular category, wherein the outcome model is trained by a process comprising:
generating a plurality of training examples from data about orders previously fulfilled, each training example including (1) a combination of a pricing policy and a category to which the pricing policy was applied and (2) a label corresponding to an outcome when the pricing policy was applied to the category;
applying the outcome model to each training example of the plurality of training examples to generate predicted outcomes for each of the plurality of training examples;
scoring the predicted outcomes for the training examples using a loss function and the labels of the corresponding training examples; and
updating one or more parameters of the outcome model by backpropagation based on the scoring;
applying the trained outcome model to multiple different assignments of a pricing policy from the plurality of pricing policies for each of the plurality of categories, wherein applying the trained outcome model generates a predicted outcome for each of the multiple different assignments;
selecting an assignment of a pricing policy for each of the plurality of categories from the multiple different assignments based on the predicted outcomes;
modifying the stored pricing policies to correspond to the selected assignment of a pricing policy for each of the plurality of categories; and
in response to the request received from the user interface presented on the client device to view the target item of the plurality of items, presenting on the user interface of the client device a price associated with the target item by applying the markup corresponding to the stored pricing policy for the category that contains the target item to the retailer price of the target item.

19. The system of claim 18, wherein the non-transitory computer readable storage medium further has instructions encoded thereon that, when executed by the processor, cause the processor to perform steps comprising:
retrieving a previously received order;
applying the outcome model to a combination of the modified pricing policies and categories included in the previously received order to generate a predicted outcome for the previously received order; and
determining a distance metric between the predicted outcome for the previously received order and an outcome from the previously received order based on prices for items in categories from the modified pricing policies and prices for items in corresponding categories in the previously received order.

20. The system of claim 18, wherein selecting the set of combinations of categories and pricing policies from application of the trained outcome model to different combinations of pricing policies applied to categories comprises:
selecting a pricing policy for each category of the set where a sum of predicted outcomes across the categories is maximized.

\* \* \* \* \*